United States Patent
Putnam et al.

[15] 3,676,389
[45] July 11, 1972

[54] FLAME PROOFING COMPOSITIONS

[72] Inventors: Robert C. Putnam, Mountain Lakes, N.J.; Jeffrey W. Young, Norristown, Pa.

[73] Assignee: Polaris Chemical Corp., Manville, N.J.

[22] Filed: June 12, 1970

[21] Appl. No.: 45,887

[52] U.S. Cl. .................. 260/29.4 UA, 106/15 FP, 117/137
[51] Int. Cl. ......................................................... C08g 51/82
[58] Field of Search .................. 260/29.4 R, 29.4 UA; 106/15 FP; 117/137

[56] References Cited

UNITED STATES PATENTS

| | | | |
|---|---|---|---|
| 2,711,998 | 6/1955 | Weaver et al. | 260/29.4 |
| 2,452,054 | 10/1948 | Jones et al. | 260/29.4 U UX |
| 2,912,392 | 11/1959 | Stilbert, Jr. et al. | 117/137 UX |
| 3,398,019 | 8/1968 | Langguth et al. | 106/15 FP X |
| 2,846,337 | 8/1958 | Cooke et al. | 260/29.4 X |
| 3,308,098 | 3/1967 | Nemes et al. | 260/29.4 X |
| 3,119,715 | 1/1964 | Reeves et al. | 260/29.4 X |
| 2,803,562 | 8/1957 | Erbel et al. | 117/137 X |
| 2,912,394 | 11/1959 | Stilbert, Jr. et al. | 117/137 X |
| 2,832,745 | 4/1958 | Hechenbleikner | 260/29.4 |
| 3,456,041 | 7/1969 | Burk et al. | 106/15 FP X |

*Primary Examiner*—Julius Frome
*Assistant Examiner*—James B. Lowe
*Attorney*—Morgan, Finnegan, Durham & Pine

[57] ABSTRACT

Aqueous flame-proofing compositions are disclosed which contain a foaming agent; a mixture of urea or thiourea and a polyhalo (Br, Cl) propanol ester of phosphoric, phosphoramidic or phosphorodiamidic acid, phosphoramide, its base-addition salts or mixtures thereof; a water-soluble amine-aldehyde resin, and an acid-generating catalyst.

12 Claims, No Drawings

FLAME PROOFING COMPOSITIONS

BACKGROUND OF THE INVENTION

This invention relates to flame-proofing compositions. More particularly, it relates to aqueous flame-proofing compositions capable of imparting effective flame-proofing properties to a carpet at unusually low concentrations.

Previous methods are known which impart flame retardation properties to various materials such as textiles, woods, etc. However, with respect to flame-proofing textiles, and in particular carpeting, those methods require the treated material to contain at least about a 10 percent by weight increase in dry pick-up to render them effectively flame resistant. Furthermore, many of the previously used treatments while providing effective properties are not stable when subjected to a washing treatment.

The present invention is concerned primarily with flame-proofing of carpets. After a reasonable period of normal use, a carpet must be cleaned and this usually entails some type of water wash or dry-foam or dry cleaning treatment. The soapy solution required to remove the spots and stains from the carpet simultaneously acts in a detrimental manner by entirely or partially removing the flame retardant material coated on the carpet. As a result, one is left with a carpet which has lost a substantial amount of its flame-proofing properties. It is apparent that as further cleanings are carried out, more of the flame retardant covering is lost.

It is, therefore, an object of this invention to furnish a flame-proofing composition which on application to a carpet provides a highly advantageous flame-proofed carpet. It is a further object to prepare effectively flame-proofed carpets which contain unusually low concentrations of flame retardant added thereon. It is a further object to prepare flame-proofed carpets which are capable of being washed under aqueous conditions repeatedly without the ensuing loss of flame retardation properties.

SUMMARY OF THE INVENTION

Accordingly, this invention is concerned with aqueous compositions capable of imparting flame-proofing properties to carpeting which contain (a) a foaming agent; (b) a mixture of urea or thiourea and a polyhalo (Br, Cl) propanol ester of phosphoric, phosphoramidic or phosphorodiamidic acid, phosphoramide, its base-addition salts and mixtures thereof; (c) a water-soluble amine-aldehyde resin; an (d) an acid-generating catalyst.

The following amounts by weight of each component are preferred:

| foaming agent | 0.7–10% |
| urea-ester mixture | 0.7–10% |
| resin | 0.2–5% |
| catalyst | 0.1–2.0% |

Even more preferred is an aqueous composition as defined above which contains the following amounts of each component:

| foaming agent | 3.5–4.0% by weight |
| urea-ester mixture | 3.0% |
| resin | 1% |
| catalyst | 0.3% |

Foaming agents which are advantageously employed in the novel compositions of this invention include ammonium salts, alkali halides and sulfamic acid. Illustrative of these types of foaming agents are: ammonium bromide, diammonium phosphate, ammonium sulfate, ammonium chloride, ammonium thiocyanate, sodium bromide, potassium bromide, potassium chloride, lithium bromide and mixtures thereof.

Of particular preference is a 1:1 parts by weight mixture of ammonium bromide and diammonium phosphate and a 1:2:1 parts by weight mixture of ammonium bromide, diammonium phosphate and ammonium sulfamate.

The urea component of the urea-ester combination is preferably urea, however, thiourea can also be utilized to provide similar results.

As for the ester component, any polyhalo (Br, Cl) propanol ester of phosphoric, phosphoramidic or phosphorodiamidic acid, phosphoramide, base-addition salts or mixture thereof is applicable for purposes of this invention. Particularly preferred esters include phosphoric acid, bis-(2,3-dibromopropyl) ester monoammonium salt; phosphoric acid, 2,3-dibromopropyl ester monoammonium salt and phosphoric acid, 2,3-dibromopropyl ester diammonium salt.

The preferred amine-aldehyde water-soluble resins for inclusion into the above-described aqueous compositions are illustrated by the following: urea-formaldehyde resin; melamine-glyoxal resin; guanidine-formaldehyde resin; and guanidine-glyoxal resin, melamine-formaldehyde; urea-glyoxal and combinations thereof.

The preferred acid generating catalyst for the aforedescribed composition are acid-addition salts of alkyl or hydroxy-alkylamines and acid salts of Group II elements. Typical examples include 2-methyl-2-aminopropanol hydrochloride, 4-aminobutanol hydrochloride, 2-methyl-2-aminopropanol hydrobromide, n-propylamine hydrochloride, ethanolamine hydrochloride, zinc chloride and magnesium chloride.

Another preferred embodiment of this invention relates to a process for treating carpeting with the aforedescribed aqueous solutions. It consists of flame-proofing a carpet by impregnating it with the aforesaid composition until the dry addon is from 0.3 to about 10 percent by weight, drying and curing the treated carpet.

DETAILED DESCRIPTION OF THE INVENTION

The novel aqueous compositions of this invention may be applied to textiles using conventional impregnation equipment and procedures. Although this invention is concerned primarily with flame proofing of carpets, it may be used suitably for blankets, upholstery and various fabrics as well.

Once treated with the compositions of this invention, the carpet will remain flame-proof even after numerous washings or shampooings. More importantly, it will retain its flame retardant characteristics even though small amounts of flame retardant material have been used in coating the carpet.

The novelty of the herein described compositions resides in the unique composition of components which permit an unusually small amount of add-on on a textile thereby rendering it effectively fire-proof.

The material ingredients of the subject aqueous composition are:

a. a foaming agent,
b. a urea-ester mixture,
c. an amine-aldehyde resin and
d. an acid-generating catalyst.

The aforesaid foaming agent is preferably an ammonium salt, an alkali halide, sulfamic acid of mixtures thereof. More specifically, the ammonium salt may be inorganic or organic, provided it is water-soluble. Suitable examples include ammonium bromide, ammonium phosphates, ammonium thiocyanates and ammonium acetate. Alkali halides which can be employed include sodium bromide, potassium bromide and lithium bromide. Sulfamic acid is also an appropriate foaming agent.

It should be noted that combinations of the aforesaid materials are generally the most preferred situation. Moreover, in any given mixture, the amount of each component is not critical provided the amount of the total mixture is sufficient to comprise from 1 to about 10 percent by weight of the aqueous composition.

Particularly effective combinations are:

ammonium bromide-diammonium phosphate (1:1 parts by weight)

ammonium bromide-diammonium phosphate-ammonium sulfate (1:2:1 parts by weight)

The urea-ester component of the aforedescribed aqueous composition is another integral part of the composition. The term urea is meant to include not only urea, but also thiourea and their water soluble derivatives. Urea and thiourea are monoacid bases and may easily be converted to a monoacid salt. For example with an equimolar amount of hydrochloric acid, the monohydrochloride salt is obtained. These acid salts are included within the purview of this application.

The amount of urea in the urea-ester mixture can range from as little as 1 to as much as 50% by weight of the mixture.

The difference will consist of the ester component which is a polyhalo (Br, Cl) propanol ester of phosphoric, phosphoramide, base-addition salts and mixtures thereof. Particularly suitable esters include:

phosphoric acid, bis-(-B 2,3-dibromopropyl)ester, monoammonium salt phosphoric acid, 2,3-dibromopropyl ester, diammonium salt phosphoric acid, 2,3-dibromopropyl ester, monoammonium salt The base-addition salt is derived from a base which contains a suitable cation such as the alkali metal, alkaline-earth metal, ammonium or water-soluble amine addition salts like the lower alkanol-ammonium and other base salts with organic amines. The conversion to base-addition salts is a straight-forward procedure. The base is treated with a substantially equimolar amount of a chosen base in an aqueous solution or in a suitable organic solvent such as methanol or ethanol.

It is obvious that for base-addition salt formations, a displaceable hydrogen ion must be available on the molecule. Accordingly, esters of phosphorodiamidic acid and diesters of phosphoramide are not readily converted to base-addition salts.

The water-soluble amine-aldehyde resins which comprise another essential ingredient of the subject compositions are those prepared from an amine selected from urea, melamine or guanidine with an aldehyde selected from formaldehyde and glyoxal. These resins are prepared by procedures well-documented in the chemical literature. The ratio of amine to aldehyde is noncritical so long as the product is water soluble. Water solubility depends primarily on the number of methylol groups.

A preferred embodiment of the present invention is directed to compositions which contain a greater amount of polyhalo ester than amine-aldehyde resin.

The last essential ingredient of the hereindisclosed aqueous solution is termed an acid generating catalyst. By the term acid generating is meant the ability to provide a protonic species. Examples of such materials include acid addition salts of alkyl amines, hydroxy alkyl amines and acid salts of Group II elements. Representative types are 2-methyl-2-aminopropanol hydrochloride, zinc chloride and magnesium chloride. Since this material acts as a catalyst, only small amounts are required in the composition. Most suitable is a range from 0.1 to 2 percent by weight and most preferred is an amount of about 0.3 percent by weight.

The method by which the textiles, carpets, etc. become flame-proof is not limiting: the composition can be applied using conventional textile impregnation equipment and procedures. Suitable methods include bath treatment, spray treatment, Kiss-Roll application and a combination of spraying and drying of carpeting after it has been installed on floor or wall. However, many other suitable methods are also possible and are within the scope of the present invention. The flame-proofing compositions can be applied by a single treatment or a plurality of treatments. The treatment is such that the resulting carpet or textile retains a dry add-on of from about 0.3 to about 10 percent by weight. After the wet treatment, the resulting material is dried and cured.

In addition to the four necessary components described above, the composition may also contain materials such as softening agents, dyes, wetting agents and the like which are non-reactive to the components of the flame-proofing compositions.

Carpets and textiles which are impregnated with the flame-proofing compositions of this invention can suitably be dried and cured using the conventional textile drying and curing procedures and apparatus.

EXAMPLE I

An aqueous composition containing the following ingredients is prepared:

| | |
|---|---|
| water | 9665 parts by weight |
| ammonium bromide | 143 parts by weight |
| diammonium phosphate | 143 parts by weight |
| urea | 71 parts by weight |
| phosphoric acid, bis-(2,3-dibromopropyl) ester, monoammonium salt | 143 parts by weight |
| melamine-formaldehyde resin | 100 parts by weight |
| 2-methyl-2-aminopropanol hydrochloride | 35 parts by weight |

FLAME-PROOFING TREATMENT

A polyester carpet made of polyethylene terephthalate with a polyethylene backing is passed through the bath containing the above aqueous composition and at a bath temperature of about 75°F. Prior to treatment, the carpet is vacuum extracted to 20 percent moisture content. After treatment, it is dried and cured in a drying range having an inlet temperature of about 350°F. and an outlet temperature of about 270°F. The carpet is then backsized and dried at 240°F. The resulting treated carpet is found to have a 2.25 percent by weight solids add-on.

WASHING TREATMENT

The treated carpet is subjected to a washing treatment comprising: immersion in a soap solution, kneading for 3 minutes, hosing off with fresh water and drying. This sequence of steps is repeated ten times. This washed product passes the U.S. Government Standard for the Surface Flammability of Carpets and Rugs DOC FF 1–70 (Pill test).

EXAMPLE II

The aqueous composition described in Example I is used to treat the following carpet samples:
a. a carpet made of polyacrylonitrile;
b. a carpet made of poly(1,4-cyclohexylene dimethylene)terephthalate;
c. a carpet made from cotton;
d. a carpet made from jute;
e. a carpet made of viscose-nylon (80:20);
f. a carpet made of polyacrylonitrile-poly (ethylene terephthalate) (50:50); and
g. a carpet made of wool.

All samples show improvement in fire-retardancy. The improvement and permanency achieved depends on several factors: construction of the carpet; amount of dry add-on; curing effects; and test methods used.

EXAMPLE III

The procedure of Example I is repeated except that the resulting carpet has the following dry add-on amounts:
0.3% by weight
0.75% by weight
1.5% by weight
3.0% by weight
7.0% by weight
10.0% by weight
All samples show improvement in fire-retardancy.

EXAMPLE IV

The procedure of Example I is repeated wherein the aqueous composition has the following percent by weight amount of foaming agent, i.e., ammonium bromide-diammonium phosphate (1:1 parts by weight):

0.7%
1.0%
1.5%
2.0%
4.0%
6.0%
7.5%
10.0%

All samples show improvement in fire-retardancy.

EXAMPLE V

The procedure of Example I is repeated wherein the aqueous composition has the following percent by weight amounts of urea-ester mixture, i.e., urea-phosphoric acid, bis-(2,3-dibromopropyl) ester monoammonium salt (1:2 parts by weight):
0.7%
1.0%
1.5%
3.0%
7.5%
10.0%

All samples show improvement in fire-retardancy.

EXAMPLE VI

The procedure of Example I is repeated wherein the aqueous composition has the following percent by weight amounts of melamine-formaldehyde resin:
0.2% by weight
0.5% by weight
1.5% by weight
2.5% by weight
5.0% by weight All samples show improvement in fire-retardancy.

EXAMPLE VII

The procedure of Example I is repeated wherein the aqueous composition has the following percent by weight amounts of said catalyst, i.e., 2-methyl-2-aminopropanol:
0.1% by weight
0.2% by weight
0.5% by weight
1.0% by weight
2.0% by weight All samples show improvement in fire-retardancy.

EXAMPLE VIII

An aqueous composition containing the following ingredients is prepared:

| | |
|---|---|
| Water | 9325 parts by weight |
| Ammonium bromide | 240 parts by weight |
| Diammonium phosphate | 240 parts by weight |
| Urea | 120 parts by weight |
| Phosphoric acid, bis-(2,3-dibromopropyl)ester, monoammonium salt | 240 parts by weight |
| Melamine-formaldehyde resin | 100 parts by weight |
| 2-methyl-2-aminopropanol hydrochloride | 35 parts by weight |

A dry wool carpet having a jute backing is treated with the above aqueous solution by a spraying technique carried out at a temperature of about 75°F., followed by backsizing and finally drying and curing at 270°F. The resulting wool carpet has a dry add-on of 2.4 percent.

After being subjected to the washing treatment described in Example I, it was tested and found to pass the pill test.

Instead of the washing treatment, a separate sample of the treated carpet was given 10 commercial shampooings by the Dry Foam process. It is then found to pass the Pill Test.

EXAMPLE IX

The procedure of Example VIII is repeated wherein the following foaming agent comprising 4.0 percent by weight of the total aqueous composition is used in place of ammonium bromide-diammonium phosphate (1:1) with good results:
ammonium bromide-diammonium phosphate-ammonium sulfamate (1:2:1 parts by weight)

EXAMPLE X

The procedure of Example VIII is repeated except an equivalent amount of thiourea is used in place of urea in the aqueous composition. The resulting carpet treated therewith shows an improvement in fire-retardancy.

EXAMPLE XI

The procedure of Example I is repeated wherein the following esters, in equivalent amounts, are used in place of phosphoric acid, bis-(2,3-dibromopropyl)ester, monoammonium salt with good results:
phosphoric acid, bis(2,3-dibromopropyl)ester
phosphoramide, bis (2,3-dibromopropyl)ester
phosphoric acid, 2,3-dibromopropyl ester
phosphoric acid, 2,3-dibromopropyl ester, monoammonium salt
phosphoramidic acid, 2,3-dibromopropyl ester
phosphoric acid, 2,3-dibromopropyl ester, diammonium salt
phosphoric acid, bis-(2,3-dibromopropyl)ester monoammonium salt-phosphoric acid, (2,3-dibromopropyl)ester, monoammonium salt (1:1)
phosphoramidic acid, 2,3-dibromopropyl ester, ammonium salt
phosphordiamidic acid, 2,3-dibromopropyl ester
phosphoric acid, bis(2,3-dichloropropyl)ester, monosodium salt
phosphoric acid, bis(2,3-dibromopropyl)ester, monopotassium salt
phosphoric acid, bis(2,3-dibromopropyl)ester, monocalcium salt

EXAMPLE XII

The procedure of Example I is repeated wherein the following resins, in equivalent amounts, are used in place of melamine-formaldehyde resin:
urea-formaldehyde resin
urea-glyoxal resin
melamine-glyoxal resin
guanidine-formaldehyde resin
guanidine-glyoxal resin
urea-formaldehyde + urea-glyoxal (1:1)

All samples show improvement in fire-retardancy.

EXAMPLE XIII

The procedure of Example VIII is repeated wherein the following acid-generating catalysts, in equivalent amounts, are used in place of 2-methyl-2-aminopropanol hydrochloride:
2-methyl-2-aminopropanol hydrobromide
4-aminobutanol hydrochloride
n-propylamine hydrochloride
ethanolamine hydrochloride
zinc chloride
magnesium bromide All samples show improvement in fire-retardancy.

What is claimed is:

1. An aqueous composition capable of imparting flame-proofing properties to carpeting by the incorporation of dry add-on of from 0.3 to 10 percent by weight which comprises:
   a. from 0.7 to about 10 percent by weight of a foaming agent selected from the group consisting of ammonium bromide, diammonium phosphate, ammonium sulfamate, ammonium chloride, ammonium thiocyanate, sodium bromide, potassium bromide, potassium chloride, lithium bromide and mixtures thereof;

b. from 0.7 to 10 percent by weight of a urea-ester mixture wherein said urea component is selected from the group consisting of urea and thiourea and said ester component is selected from the group consisting of phosphoric acid, bis-(2,3-dibromopropyl) ester, monoammonium salt; phosphoric acid, 2,3-dibromopropyl ester, monoammonium salt; phosphoric acid, 2,3-dibromopropyl ester, diammonium salt; a mixture of phosphoric acid, bis-(2,3-dibromopropyl)ester, monoammonium salt and phosphoric acid, 2,3-dibromopropyl ester, monoammonium salt (1:1 by weight); phosphoric acid, bis-(2,3-dibromopropyl)ester; phosphoramide, bis (2,3-dibromopropyl)ester; phosphoric acid, 2,3-dibromopropyl ester; phosphoramidic acid, 2,3-dibromopropyl ester; phosphoramidic acid, 2,3-dibromopropyl ester, ammonium salt; phosphordiamidic acid, 2,3-dibromopropyl ester; phosphoric acid, bis(2,3-dichloropropyl)ester, monosodium salt; phosphoric acid, bis(2,3-dibromopropyl)ester, monopotassium salt; phosphoric acid, bis(2,3-dibromopropyl)ester, monocalcium salt; the amount of urea component in said urea-ester mixture ranging from 1 to 50 percent by weight of said mixture;

c. from 0.2 to about 5 percent by weight of a water-soluble amine-aldehyde resin selected from the group consisting of urea-formaldehyde, melamine-glyoxal, guanidine-formaldehyde, guanidine-glyoxal, melamine-formaldehyde and urea-glyoxal; and d. from 0.1 to about 2 percent by weight of an acid-generating catalyst selected from the group consisting of 2-methyl-2-aminopropanol hydrochloride, 4-aminobutanol hydrochloride, 2-methyl-2-aminopropanol hydrobromide, n-propyl-amine hydrochloride, ethanolamine hydrochloride, zinc chloride and magnesium chloride.

2. The composition of claim 1 wherein said foaming agent is a 1:1 parts by weight mixture of ammonium bromide and diammonium phosphate.

3. The composition of claim 1 wherein said foaming agent is a 1:2:1 parts by weight mixture of ammonium bromide, diammonium phosphate and ammonium sulfamate.

4. The composition of claim 1 wherein said urea-ester mixture is a 1:2 parts by weight mixture of urea and phosphoric acid, bis-(2,3-dibromopropyl) ester, monoammonium salt.

5. The composition of claim 1 wherein said urea-ester mixture is a 1:2 parts by weight mixture of urea and phosphoric acid, 2,3-dibromopropyl ester, monoammonium salt.

6. The composition of claim 1 wherein said urea-ester mixture is a 1:2 parts by weight mixture of urea and phosphoric acid, 2,3-dibromopropyl ester, diammonium salt.

7. The composition of claim 1 wherein said urea-ester mixture is a 1:1:1 parts by weight mixture of urea, phosphoric bis-(2,3-dibromopropyl) ester, monoammonium salt and phosphoric acid, 2,3-dibromopropyl ester, monoammonium salt.

8. The composition of claim 1 wherein said amine-aldehyde water-soluble resin is a melamine-formaldehyde resin.

9. The composition of claim 1 wherein said catalyst is 2-methyl-2-aminopropanol hydrochloride.

10. The composition of claim 1 wherein said catalyst is zinc chloride.

11. An aqueous composition as claimed in claim 1 which comprises:
   a. about 3.5 percent by weight of a 1:1 parts by weight mixture of ammonium bromide and diammonium phosphate;
   b. about 3 percent by weight of a 1:2 parts by weight mixture of urea and phosphoric acid, bis-(2,3-dibromopropyl) ester, monoammonium salt;
   c. about 1 percent by weight of a melamine-formaldehyde water soluble resin; and
   d. about 0.3 percent by weight of 2-methyl-2-aminopropanol hydrochloride.

12. An aqueous composition as claimed in claim 1 which comprises:
   a. about 4.0 percent by weight of a 1:2:1 parts by weight mixture of ammonium bromide, diammonium phosphate and ammonium sulfamate;
   b. about 3 percent by weight of a 1:2 parts by weight mixture of urea and phosphoric acid, bis-(2,3-dibromopropyl) ester, monoammonium salt;
   c. about 1 percent by weight of a melamine-formaldehyde water-soluble resin; and
   d. about 0.3 percent by weight of 2-methyl-2-aminopropanol hydrochloride.

* * * * *

UNITED STATES PATENT OFFICE
CERTIFICATE OF CORRECTION

Patent No. 3,676,389            Dated July 11, 1972

Inventor(s) Robert C. Putnam et al.

It is certified that error appears in the above-identified patent and that said Letters Patent are hereby corrected as shown below:

Column 2, line 57, change "of" to --or--.

Column 2, line 75, change "sulfate" to --sulfamate--.

Column 4, line 28, change "350°F." to --305°F.--.

Signed and Sealed this thirteenth Day of January 1976

[SEAL]

Attest:

RUTH C. MASON
*Attesting Officer*

C. MARSHALL DANN
*Commissioner of Patents and Trademarks*